US012493477B2

(12) United States Patent
Gong et al.

(10) Patent No.: US 12,493,477 B2
(45) Date of Patent: Dec. 9, 2025

(54) SYSTEMS AND METHODS FOR PROVISIONING AND CONFIGURING COMPUTING SERVICES

(71) Applicant: PepsiCo, Inc., Purchase, NY (US)

(72) Inventors: George Xu Gong, Purchase, NY (US); Birojit Nath, Telangana (IN); Eric Jackson, Plano, TX (US); Ravinder Gaur, Plano, TX (US)

(73) Assignee: PepsiCo, Inc., Purchase, NY (US)

( * ) Notice: Subject to any disclaimer, the term of this patent is extended or adjusted under 35 U.S.C. 154(b) by 60 days.

(21) Appl. No.: 18/661,175

(22) Filed: May 10, 2024

(65) Prior Publication Data

US 2025/0348327 A1   Nov. 13, 2025

(51) Int. Cl.
*G06F 9/445* (2018.01)
*H04L 9/40* (2022.01)

(52) U.S. Cl.
CPC ........ *G06F 9/44505* (2013.01); *H04L 63/105* (2013.01)

(58) Field of Classification Search
CPC ............... G06F 11/302; G06F 11/3495; G06F 15/7882; G06F 2201/865; G06F 8/61; G06F 9/4416
See application file for complete search history.

(56) References Cited

U.S. PATENT DOCUMENTS

| | | | | |
|---|---|---|---|---|
| 8,886,933 B1* | 11/2014 | Poiesz | ................ | H04W 12/37 705/40 |
| 9,146,721 B1* | 9/2015 | Nagaraja | ................ | G06F 8/61 |
| 11,736,579 B1* | 8/2023 | Miller | ................ | G06F 9/5072 709/226 |
| 11,751,050 B2* | 9/2023 | Alpert | ................ | H04L 63/0428 370/329 |
| 11,762,644 B2* | 9/2023 | Tav | ................ | G06F 9/4416 713/2 |
| 12,028,224 B1* | 7/2024 | Kwatra | ................ | H04L 41/084 |
| 12,184,482 B2* | 12/2024 | Pancholi | ............. | H04L 41/0806 |
| 12,355,626 B1* | 7/2025 | Varakantam | ............ | G06F 9/455 |
| 2018/0189088 A1* | 7/2018 | Chen | ................ | G06F 16/188 |
| 2018/0203680 A1* | 7/2018 | Nakanoya | ............ | G06F 9/5077 |
| 2020/0327022 A1* | 10/2020 | Cramer | ............... | G06F 9/45558 |
| 2021/0208934 A1* | 7/2021 | Jadhav | ................ | G06F 8/60 |

(Continued)

*Primary Examiner* — Olugbenga O Idowu
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for provisioning and configuring a computing service. An embodiment operates by receiving a request for the provisioning and configuration of the computing service. A template corresponding to setting up the computing service is identified. A first portion of a template file is generated based on the template, and the first portion is applied as input to a provisioning engine to generate one or more provisioned values as a result provisioning the computing service. A second portion of the template file is generated based on the template, and the second portion of the template file is applied as input to a configuring engine to configure the computing service. It is determined that the service has been configured, and the computing service is provided for use by one or more users.

20 Claims, 4 Drawing Sheets

(56) References Cited

U.S. PATENT DOCUMENTS

| | | | |
|---|---|---|---|
| 2022/0035541 A1* | 2/2022 | Genereux | G06F 3/067 |
| 2022/0391199 A1* | 12/2022 | Ashrafzadeh | G06F 11/3476 |
| 2023/0075183 A1* | 3/2023 | Copty | G06F 8/51 |
| 2025/0007777 A1* | 1/2025 | Chibon | G06F 8/76 |
| 2025/0053404 A1* | 2/2025 | Chibon | G06F 8/65 |

* cited by examiner

FIG. 1

```
47  output "qqq_ns_01" {
48    value = {
49      type              = "aksvirtualsrv"
50      cluster_name      = var.cluster_name
51      namespace_name    = var.namespace_name
52
53
54      web_url_name      = var.appgw_web_url_name
55      istio_gateway_url = var.istio_gateway_url
56
57      sub_id            = var.sub_id
58      rg_name           = var.rg_name
59      env               = var.env
60      ad_group_id       = var.ad_group_object_id
61    }
62  }
63
64
65  output "qqq_palo_policy_lookup_01" {
66    value = {
67      type              = "policylookup"
68      web_url_name      = var.appgw_web_url_name
69      region            = var.location
70    }
71  }
72
73  output "qqq_palo_policy_creation_01" {
74    value = {
75      type              = "policycreation"
76      web_url_name      = var.appgw_web_url_name
77      region            = var.location
78    }
79  }
80  output "qqq_nsg_01" {
81    value = {
82      type              = "nsg"
83      nsg_resid         = var.nsg_resource_id
84      ruleflow          = "ob"
85      destination       = module.qqq_cosmos_pe.ip_address
86      port              = 443
87      protocol          = "tcp"
88
89    }
90  }
```

Lines 47–62: *Integrates respective configuration management force Workflow with all required parameters* — 202

Line 75: *Identifies which CE Workflow to be triggered* — 204

Line 85: *PE generated variables* — 206

Integration layer for PE106 and CE108 for full stack Provision and Configuration

SYSTEMS AND METHODS FOR PROVISIONING AND CONFIGURING COMPUTING SERVICES

TECHNICAL FIELD

The described embodiments generally relate to provisioning and configuring computing services.

BACKGROUND

Setting up a computing device or computing service is a very time consuming, technically orientated, manual task that often requires specialized technical knowledge because the programs being used to assist with the set up process cannot directly communicate with each other. As such, oftentimes an organization will task a small group of engineers or technologists to set up the computing services across the organization. However, this creates a bottleneck when new services are requested or required, especially as the size of the organization grows, and even more so when such growth is in tandem with it's corporate, information security, and technical governing policies.

Furthermore, there is often a set of computing services or set ups that are used or requested over and over again throughout the organization. Manually setting up the same computing service over and over again for different users is a waste of valuable manpower, a waste of computing resources which are unusable during the set up process, and is both time consuming and susceptible to human error

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. The drawing in which an element first appears is typically indicated by the leftmost digit(s) in the corresponding reference number.

DETAILED DESCRIPTION

Provided herein are system, apparatus, device, method and/or computer program product embodiments, and/or combinations and sub-combinations thereof, for providing a services provisioning and configuration system.

Setting up a computing device or computing service is a very time consuming, technically orientated, manual task that often requires specialized technical knowledge because the programs being used to assist with the set up process cannot directly communicate with each other. As such, oftentimes an organization will task a small group of engineers or technologists to set up the computing services across the organization. However, this creates a bottleneck when new services are requested or required, especially as the size of the organization grows, and even more so when such growth is in tandem with its corporate, information security, and technical governing policies.

Furthermore, there is often a set of computing services or set ups that are used or requested over and over again throughout the organization. Manually setting up the same computing service over and over again for different users is a waste of valuable manpower, a waste of computing resources which are unusable during the set up process, and is both time consuming and susceptible to human error.

Figure 1:
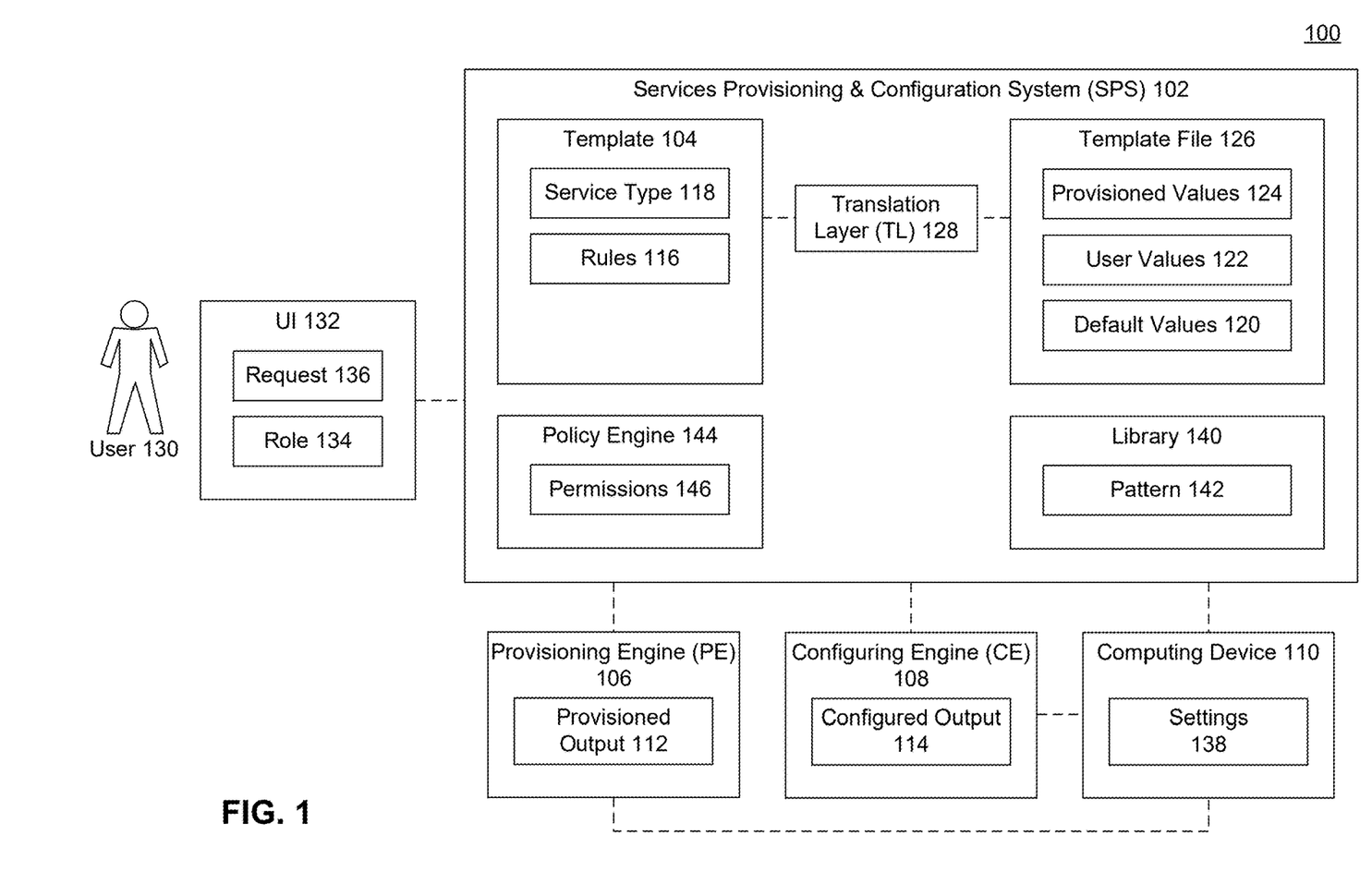
FIG. 1 is a block diagram illustrating example functionality for a services provisioning and configuration system (SPS), according to some embodiments.

FIG. 1 is a block diagram 100 illustrating example functionality for a services provisioning and configuration system (SPS) 102, according to some embodiments. SPS 102 may simplify, automate, and allow for user customization of provisioning and configuration tasks for computing services and computing devices. In some embodiments, SPS 102 may serve as or provide a communications medium allowing for disparate computing programs to communicate with each other through the intermediary of SPS 102.

In some embodiments, SPS 102 may include a template 104 for how to set up various computing services that are anticipated to be requested or used within an organization. Template 104 may be reusable and allow SPS 102 to set up the same service multiple times and/or allowing for multiple services to be provisioned and configured in parallel utilizing template(s) 104. SPS 102 may automatically configure (without human intervention) multiple computing systems using the same template 104, thus streamlining and automating provisioning and configuring tasks while simultaneously avoiding the error-prone, time consuming, and resource consuming manual set up process that would otherwise be required to be performed over and over again by one or more technical users.

As referenced above, in some embodiments, SPS 102 may use template 104 to help provide a communications interface between a provisioning engine (PE) 106 and a configuring engine (CE) 108, which may be utilized by SPS 102 to perform at least a portion of the provisioning and configuration tasks, respectively, for computing services. Example computing devices and computing services which may be provisioned and configured by SPS 102 may include, but are not limited to, a virtual machine (VM), artificial intelligence service, load balancer, database, router, storage, etc. As used herein, the term computing services may be used to include any computing devices and/or computing services which are requested for provisioning and/or configuring.

Provisioning engine (PE) 106 may include a device, program, system, computing service, or software that manages and provisions computing resources, such as computing infrastructure components. For example, PE 106 may receive a command from SPS 102 indicating what computing services, such as what cloud service(s), are needed or requested by a user 130 via request 136. In some embodiments, PE 106 may have its own unique computing or PE language in which it communicates and which is used to request various computing services to be provisioned.

For example, a user 130 may submit a request 136 for a VM. SPS 102 may then generate a corresponding a command in the unique PE language for the VM. SPS 102 may submit this command to PE 106 which may then provision a portion of a computing device 110 (or portions across multiple computing devices 110) for use as a VM by user 130, in response to the command.

In some embodiments, upon completion of its provisioning tasks, PE 106 may generate a provisioned output 112. The provisioned output 112 may include information related to the provisioned service (e.g., VM), such as an Internet Protocol (IP) address, media access control (MAC) address, login information, or other information related to identifying and/or using the provisioned computing resources. SPS 102 may be configured to read and extract information from this provisioned output 112, information which may then need to be provided to CE 108 as part of the configuration process, as described in greater detail below.

In some embodiments, PE 106 may include products such as (but not limited to): TERRAFORM, AWS CLOUDFORMATION, and GOOGLE CLOUD DEPLOYMENT MANAGER. For simplicity, some examples described herein may reference the operations of TERRAFORM, however it is understood that the description is applicable to any provisioning service or product.

Configuring engine (CE) 108 may include a device, program, system, computing service, or software that manages and configures computing resources, such as software, apps, or programs. In some embodiments, CE 108 may perform configurations on the computing service(s) that have been provisioned (e.g., using PE 106). For example, while PE 106 may provision a portion of computing device 110 for use as a VM, CE 108 may configure the VM according to user requirements by, for example, installing an operating system and other programs on the VM or by connecting the VM to a particular database.

In some embodiments, CE 108 may perform the configuration of one or more computing services across one or more computing devices 110, and generate or provide a configured output 114 upon a completion of one or more of the configuration tasks. The configured output 114 may include a notification that the configuration or portion of the configuration is complete, a summary of the configuration, an indication whether any errors occurred during the configuration, an indication as to whether any additional information is needed to perform or complete the configuration, or any other information related to the configuration. SPS 102 may be configured to read and extract information from this configured output 114, information which may then need to be provided to the user 130 to actually access or use the configured service.

In some embodiments, CE 108 may include products such as (but not limited to): ANSIBLE, PUPPET, CHEF, and CFE ENGINE. For simplicity, some examples described herein may be based on the operations of ANSIBLE, however it is understood that the description is applicable to any provisioning service or product. In some embodiments, CE 108 may include its own computing language or CE language (unique from the computing language of PE 106 referenced above) through which SPS 102 communicates with CE 108.

One of the many technical challenges encountered when using a PE 106 and a CE 108 together is that the PE 106 and CE 108 cannot directly communicate with each other. As referenced above, PE 106 may communicate in its own PE language, while CE 108 communicates in its own CE language. Conventionally a technical human user, who is familiar with both PE 106 and CE 108, would need to act as the manual intermediary providing instructions to both PE 106 and CE 108. This process however is time consuming, resource consuming in that the computing resources are made unavailable during the manual provisioning and configuration tasks, and introduces the probability of human error, which in turn may lead to bottlenecks that may even lead to delays in product launches or other important initiatives. In industries where supply and demand can fluctuate, like in seasonal or cyclical markets, this is an acute problem and can lead to significant losses.

Additionally, oftentimes PE 106 and CE 108 require a user to manually enter values for a variety of different technical parameters, for each service being provisioned and configured. This again, is a manual and time consuming process that introduces the possibility of human error and costly delays. Even if the same service is being provisioned and configured multiple times, then the human user must manually repeat this process, entering the same values over and over again.

Oftentimes, CE 108 requires information from the provisioned output 112 of PE 106 to perform or complete its configuration process or tasks. For example, in order to configure a provisioned VM, CE 108 may need to know the IP address of the VM, which may need to be identified and retrieved from provisioned output 112. This again, would conventionally often require a user to manually identify and write down the requisite information from provisioned output 112 and provide this information to CE 108 in a computing language CE 108 understands.

SPS 102 provides an intermediary computing system or architecture that allows for automated communications between PE 106 and CE 108 through the use of a template 104, without the need for manual intervention. SPS 102 improves the speed, accuracy, and efficiency in both the provisioning and configuration of computing services.

In some embodiments, SPS 102 may use a template 104 to help bridge the communication gap between two different software or computing systems that may operate independently with their own computing languages, without direct communications, which may be used together to achieve a desired outcome. In the examples provided herein, SPS 102 may provide a communications bridge between PE 106 and CE 108 using template 104, to more efficiently and programmatically perform provisioning and configuration tasks for computing services.

In some embodiments, template 104 may include a collection of one or more rules 116 corresponding to information that is required by PE 106 and/or CE 108 in order to complete the provisioning and configuration of a computing service. The rules 116 may include any information that needs to be provided to PE 106 and/or CE 108 to perform the provisioning and configuration of a service type 118 associated with the template 104. The rules 116 may be instructions or commands to direct or guide the PE 106 and/or CE 108 on how to provision and configure the computing service. In some embodiments, template 104 may include a first template for PE 106 and a second corresponding template for CE 108, used together by SPS 102 for provisioning and configuring a requested computing service.

In some embodiments, the values for the rules 116 corresponding to the template 104 may be stored in a template file 126. For example, the template 104 may be a reusable outline indicating what variables, parameters, or rules 116 are needed to build, set up, provision, and/or configure a particular service type 118, and the template file 126 may include an instance of template 104 with specific values for the rules 116.

In some embodiments, the template file 126 may include multiple files. Template file 126 may be an instance of template 104, and template file 126 may be used to provide specifications and parameters to provision and configure specific computing services. For example, one file may be for PE 106 and store values for rules 116 to be provided to for PE 106 for performing provisioning tasks, and may be written in the computing language applicable for PE 106. A second file may be used for CE 108 and store values for rules 116 to be provided to for CE 108 for performing provisioning tasks, and may be written in the computing language applicable for CE 108.

In some embodiments, the values for each of the rules 116 may be received or retrieved from any of a variety of different sources. In some embodiments, the values for the rules 116 may include default values 120, user values 122, and provisioned values 124.

In some embodiments, template file 126 may be generated, at least in part, by a translation layer (TL) 128. As described herein, TL 128 may perform several different functions related to communications. For example, TL 128 may receive user values 122 from a user 130, translate received user values 122 into detailed technical values based on pre-configured data mapping rules, and retrieve and fill-in or provide any missing or necessary default values 120 for the various rules 116 of template 104.

In some embodiments, TL 128 may communicate directly with PE 106 and CE 108. For example, TL 128 may provide or make available the values for the rules 116 that are provided to PE 106 and CE 108. TL 128 may also analyze provisioned output 112 to determine any provisioned values 124 which may then be provided to CE 108.

In some embodiments, template 104 may be a language extension. For example, PE 106 may be TERRAFORM, and CE 108 may be ANSIBLE. These two programs may be independent from each other, and unable to communicate with each other. However, it may be desirable to use TERRAFORM to perform provisioning tasks, and use ANSIBLE to perform configuring tasks.

TERRAFORM may generate provisioned output 112 which may include Output statements generated by TERRAFORM during and/or as a result of performing the provisioning tasks associated with the request 136. The Output statements may include information relevant to using or accessing and configuring whatever computing services were provisioned by TERRAFORM. However, because the OUTPUT statements may be in a specific syntax, format, and computing language unique to TERRAFORM, these OUTPUT statements cannot be understood by or directly provided to ANSIBLE, which may include its own unique syntax, format, or computing language.

However, TL 128 may be configured to read the Output statements from TERRAFORM, extract the relevant information corresponding to one or more rules 116 of the template 104, and store this information as provisioned values 124 in a template file 126. In some embodiments, template 104 may comprise a schema that combines the information retrieved by TL 128 from the Output statements of TERRAFORM with the input that may be required by ANSIBLE. In some embodiments, the provisioned values 124 may be stored in a language and/or syntax that is compatible with ANSIBLE or whatever other CE 108 that may be used. As such, SPS 102, through template file 126, may provide a language bridge or language extension providing for indirect communications between TERRAFORM and ANSIBLE without user intervention.

In some embodiments, a user 130 may request 136 new or updated computing services from SPS 102 via a user interface (UI) 132. In some embodiments, the user 130 may be required to login to be authenticated to the system. Through the UI 132, the user 130 may submit a request 136 for the provisioning and/or configuration of one more computing services based on a selection of a service type 118. The provisioning and/or configuration may be for a new computing service, or may be to update a previously provisioned and/or configured computing service.

The service type 118 may indicate what computing service or computing device 110 is being requested by the user 130. Examples of different service types and computing devices 110 may include requesting a data lake, requesting an analytics platform, requesting a VM, requesting an artificial intelligence portal, or requesting additional storage. As used herein, the term computing service is used generally to cover any computing service and/or computing device that is available to be provisioned and/or configured by SPS 102. In some embodiments, the service type 118 may include a name or identifier of a previously provisioned and/or configured computing service for which an update is being requested.

In some embodiments, SPS 102 may determine a role 134 of the user 130. The role 134 may be determined based on the login information provided by the user, by the user device being used to access UI 132, or through a user selection or entry via the UI 132. The role 134 may include a specific title or experience of the user 130, the role 134 may include a particular business function, client, department, region, or project the user 130 is working on or for which the service type 118 is being requested.

Oftentimes the users 130 may be non-technical or the roles 134 associated with the users may include non-technical positions, such as legal, finance, business affairs, human resources, etc. However, the request 136 may be for a computing service corresponding to the service type 118. Provisioning and configuring the computing service is a technical task beyond the capabilities of non-technical users. As such, the user 130 may not be equipped or be able to provide many of the values for the technical parameters or rules 116 that may be necessary to fulfill the request 136 for the service type 118.

In conventional set ups, the task of deciding what values to enter for the technical rules would be assigned to a technical user (not shown), however this process is manual, slow, time consuming, and susceptible to human errors and inconsistencies. This conventional process is also inefficient, as oftentimes many of the requests are similar, if not identical. Thus, if a user requests five VMs, then the technical user would have to manually enter the same values for the rules five different times, which is both slow and inefficient and prone to human errors and inconsistencies, and which also renders to computing resources unusable by the user 130 during the manual process.

SPS 102 standardizes and automates the provisioning and configuration of new computing services in ways that are more efficient, replicable, and accessible to business or non-technical users. For example, SPS 102 may allow a non-technical user 130 to enter or optionally enter user values 122 for only a subset of the rules 116 which the user 130 may be capable of deciding upon.

The values received from the user 130 are referred to herein generally as user values 122. Some example user values 122 may include information such the size of a requested storage, the anticipated location of use of a service (e.g., which could impact on which geographically located computing device 110 the service is configured), a username/password for the service, a preference on operating system, etc. In some embodiments, the user values 122 may correspond to a subset of the rules 116 of the template 104.

In some embodiments, the rules 116 which the user 130 is prompted for or is capable of entering via UI 132 may be determined by SPS 102 based on their role 134. Thus, two different users 130 in two different roles 134, both of whom are requesting a VM, may be prompted for different values for different rules 116.

In some embodiments, SPS 102 may load or use different templates 104 or different versions of the same template 104 for the same service type 118, each template 104 being customized based on the role 134 submitting the request 136. In some embodiments, the UIs 132 for different roles 134 requesting the same service type 118 may look different because each UI 132 may be generated based at least in part on the underlying template 104. As such, that each role 134 may be prompted or be able enter different information even when requesting the same service type 118. In some embodiments, this template selection and/or customization of the UI 132 may be performed, at least in part, by translation layer (TL) 128.

In some embodiments, TL 128 may translate non-technical user inputs into detailed technical inputs based on a pre-configured data mapping, and/or load a set of default values 120. The default values 120 may include values that correspond to technical rules 116 which the user 130 may be unable or not authorized to provide. In some embodiments, the default values 120 may vary based on role 134 and/or service type 118, such that the same rule 116 may include different default values 120 for different requests 136 for the same service type 118 if the requests are made by different roles 134.

In some embodiments, a default value 120 may exist for a particular rule 116 for which a user 130 is prompted or requested to input. The user 130 may enter their own user value 122 for the rule 116, which may be used in lieu of the default value 120 for that rule 116.

In some embodiments, TL 128 may also receive or retrieve a set of one or more provisioned values 124. A provisioned value 124 may include a value that is not available until after the PE 106 has completed at least a portion of its provisioning tasks or functionality. As noted above, in some embodiments, translation layer 128 may identify the provisioning values 124 from provisioned output 112. One example of a provisioning value 124 may be an IP address of newly provisioned computing service, such as a VM. In the example of TERRAFORM, the provisioned output 112 may include a set of Output statements, and one of the Output statements may include the IP address for a provisioned VM.

In some embodiments, TL 128 may generate a template file 126. The template file 126 may include one or more files or memory or storage locations, including a database, where values (e.g., default values 120, user values 122, provisioned values 124) corresponding the rules 116 of template 104 are stored and made accessible to PE 106 and CE 108. For example, provisioning the requested service type 118 may require particular rules 116 whose corresponding values are stored in template file 126. Then, for example, when a provisioning request is provided to PE 106, the corresponding and necessary values (e.g., user values 122 or default values 120) may be retrieved and provided or otherwise made accessible to PE 106 in a language, format, or syntax understandable by PE 106.

Upon a completion of the provisioning tasks from PE 106, TL 128 may retrieve any provisioned values 124 from provisioned output 112, and store the provisioned values 124 in template file 126. Then, for example, SPS 102 may submit a configuration request or command to CE 108 to configure the provisioned service, and may submit as part of the configuration request, with any necessary provisioned values 124, user values 122, and/or default values 120 as may be stored in and/or retrieved from template file 126. The configuration request may be generated by TL 128 in a format, syntax, or language understandable by CE 108.

In some embodiments, PE 106 and CE 108 may affect, alter, or update the settings 138 across one or more computing devices 110 in response to request 136. Settings 138 may include any alterable features or characteristics of computing device 110 that are accessible to PE 106 and/or CE 108. Example settings 138 may include, but are not limited to, accessing a particular layer (e.g., physical, data link, network, transport, session, presentation, application), creating a partition or allocating other resources from computing device 110 for use, creating communications between two or more computing devices 110 (e.g., such as server and a database), and installing, updating, or removing computing programs. For simplicity, only a single computing device 110 is illustrated, however it is understood any number computing devices 110 may be provisioned and configured as described herein.

Once the settings 138 of computing device 110 have been updated by PE 106 and CE 108, CE 108 may send configured output 114 to SPS 102 indicating a result of the configuration tasks. If everything was configured successfully, SPS 102 may provide a message or notification to user 130 via UI 132 indicating that the requested service is ready for use. If there are any errors in configured output 114, SPS 102 may report these errors to user 130 and/or one or more other technical users to resolve the errors.

In some embodiments, SPS 102 may include or have access to a library 140 including one or more patterns 142 and/or templates 104. Library 140 may include one or more collections or storage locations where templates 104 and patterns 142 may be stored and accessed. In some embodiments, library 140 may include one or more previously generated template files 126.

For simplicity, only a single template 104 is illustrated. However it is understood that SPS 102 may include any number of templates 104, each template 104 corresponding to a service type 118, and further configured for various roles 134 or users 130. For example, SPS 102 may include a general VM template 104 and a storage request template 104, and in some embodiments, there may be multiple VM templates, each for a different role 134 and/or user 130 who may authorized to request the VM.

In some embodiments, two or more templates 104 may be used together or may be anticipated to be used together, as a pattern 142. Pattern 142 may include a collection or template of two or more templates 104 that may be provisioned and/or configured to be used together. In some embodiments, a pattern or each pattern may correspond to a different use case or set up for computing services. For example, a web app template 104 and a web server template 104 may often be used together to provision and configure a web app system, in a particular use case. To increase the speed and simplicity of provisioning and configuring these services being used together, SPS 102 may make available a pattern 142 which may include a combination of two or more templates 104 that may be provisioned and configured together.

The pattern 142 for a web app and web server, may be referred to a web app system pattern 142. Then, for example, user 130 may have the option of submitting a request 136 for the web app template 104, the web server template 104, or the web app system pattern 142. If the user 130 selects the web app system pattern 142, the user 130 may be prompted, via UI 132, to enter any user values 122 for both the web app and the web server prior to configuring either service. In some embodiments, a user 130 may select multiple computing services or templates, which are to be interconnected or communicatively coupled with each other, with a single request 136. In some embodiments, SPS 102 may save this as a new pattern 142 in library 140, which can be used again later by the same or different user 130.

In some embodiments, the default values 120 for a pattern 142 may be different, in part, from the default values 120 for an underlying template 104. For example, the default value 120 for a connectivity rule 116 for a web app template 104 may be different from the default value 120 for the connectivity rule 116 when the web app system pattern 142 (which may use the web app template 104) is selected. For example, the connectivity rule 116 for the web app system pattern 142 may include a default value 120 or provisioned value 124 that points to the corresponding web server that is provisioned as part of the pattern 142. In some embodiments, the connectivity rule 116 may be transformed from a user value 122 or default value 120 in the template 104, to a provisioned value 124 or different default value 120 in the pattern 142. For simplicity, a single pattern 142 is illustrated, however it is understood SPS 102 may have access to or make available any number of different patterns 142.

In some embodiments, SPS 102 may monitor which templates 104 are often requested by the same user 130 within a short period of time, and may generate or recommend the generation of a corresponding pattern 142 for the templates 104 that are often requested in a similar timeframe.

In some embodiments, SPS 102 may include or have access to a policy engine 144 with permissions 146 for different users 130 and/or roles 134 for what is able to be requested, provisioned, and/or configured. In some embodiments, provisioning and configuring various services can cost an organization in different ways, both monetarily and with regards to availability of different computing resources that would be required to fulfill different requests 136. As such, it may be beneficial to incorporate corporate or organizational policies to limit users 130 and roles 134 are authorized to request which services. These policies may be implemented within policy engine 144 and applied using permissions 146.

As noted above, a user 130 may provide user values 122 in accordance with requesting 136 a provisioning and/or configuration of a particular service type 118. In some embodiments, policy engine 144 may validate or verify that the user values 122 are in accordance with the permissions 146 attributed with the user 130 (or user role 134). If policy engine 144 determines that a user value 122 is not accordance with the permissions 146, then SPS 102 may generate a rejection notification which is provided to the user 130 via the UI 132. The rejection notification may prompt the user 130 for new user values 122 in accordance with the permissions 146. In some embodiments, the rejection notification may provide an indication as to what was wrong with the submitted user values 122 and/or what (range of) user values 122 may acceptable or in accordance with permissions 146.

For example, requesting a full stack computing service may cost an organization upwards of $1,000,000, and as such may only be accessible to a small number of authorized roles (as indicated by permissions 146). Then, for example, an unauthorized user 130 may not even be presented with the option of requesting the full stack computing service via UI 132, or any such request 136 may be prohibited, if submitted. These policy initiatives may include security protocols as well, preventing particular users 130 or roles 134 from performing activities that may create security threats.

Policy engine 144 may allow for simple and widespread corporate governance over the automated system for requesting computing services as provided by SPS 102. The ability to consistently and dynamically institute rules is a significant technological problem faced by companies of all sizes. For example, in large multinational corporations, it is important to be able to implement corporate policies, information security provisions, data access permissions, and other such features across various regions, countries, or function groups. For example, members in the information technology group may have different rules and data access permissions than members of the marketing group. This may vary further by country or region. Moreover, as another example, a company with limited resources looking to dynamically change and implement rules will also find that this feature solves a long felt and unsolved need.

In some embodiments, a user 130 who has access to or who has previously requested an already provisioned and/or configured computing service, may submit a request 136 to update the computing service. The request 136 may include a new user value 122 for one or more of the rules 116 and/or an indication as to what settings 138 need to be updated or changed.

For example, if user 130 has requested two identical VM computing services, user 130 may submit a request 136 to update a value of a first rule 116 in template file 126 corresponding to the two VM computing services. The updated value may then be applied, by SPS 102, to both VMs with the one request 136.

In some embodiments, SPS 102 may provide the user 130 the option of selecting one of the VMs to which to apply the update. Then, for example, SPS 102 may make a copy of the template file 126 and update one copy of the template file 126 with the new or updated value provided by the user request 136. In some embodiments, the request 136 to update may include the re-execution of PE 106 and/or CE 108.

Figure 2:
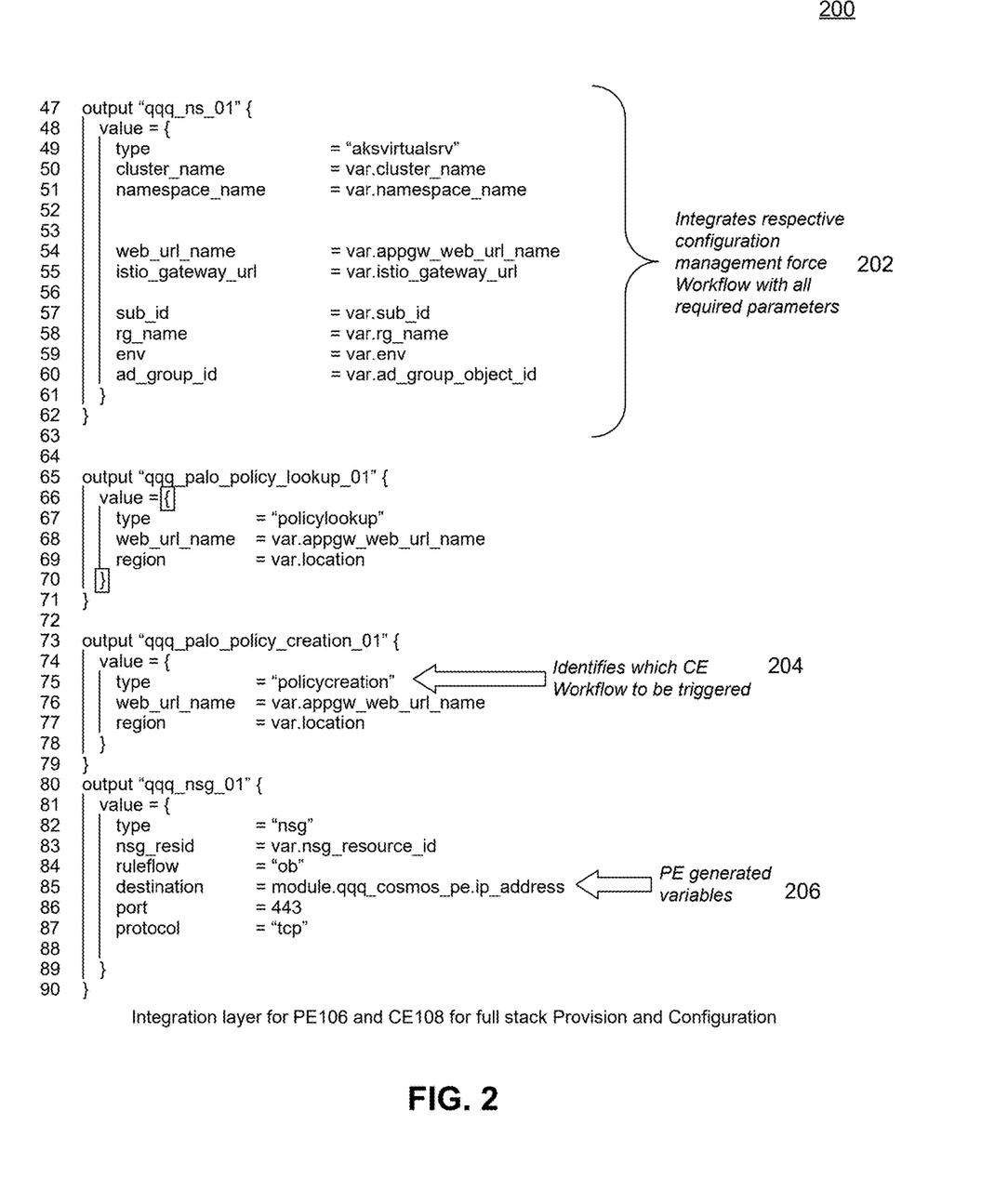
FIG. 2 illustrates an example code corresponding to functionality of a services provisioning and configuration system (SPS), according to some example embodiments.

FIG. 2 illustrates example code 200 corresponding to functionality of a services provisioning and configuration system (SPS) 102, according to some example embodiments. The code 200 illustrates extension to PE 106 may allow for the seamless or automatic (without user intervention) flow of data between PE 106, SPS 102, and CE 108, as may be generated by TL 128.

The code 200 may include data and provisioned values 124 that are retrieved from provisioned output 112 (e.g., portion 206), includes user values 122, and default values 120 (e.g., portion 202), and instructions to CE 108. For example, in 204, the type="policy creation" may be an instruction to CE 108 indicating which configuration workflow is to be triggered. illustrates several different portions. Output statements which may be generated by PE 106. TL 128 may parse code 200.

Figure 3:
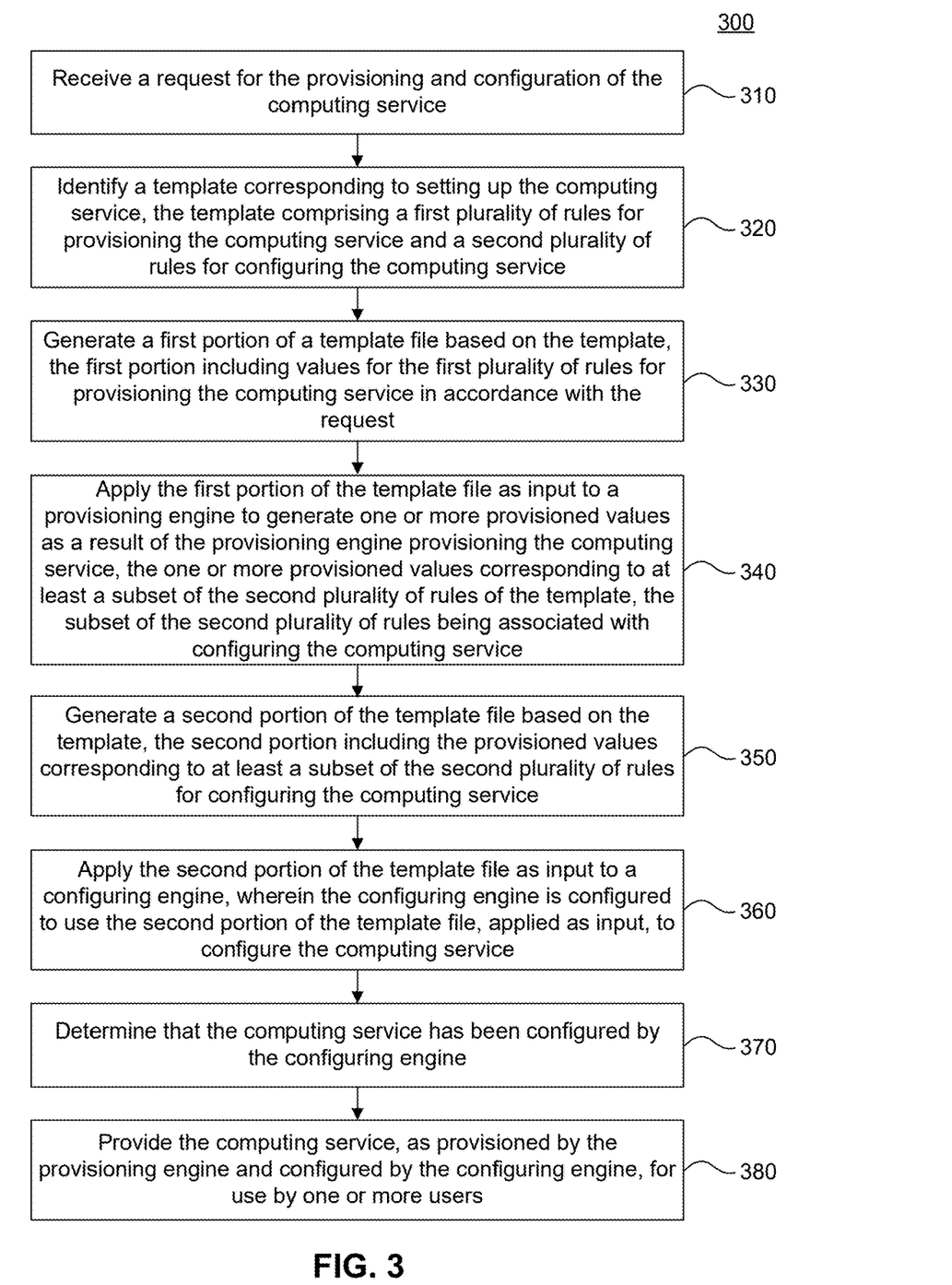
FIG. 3 is a flowchart illustrating example operations for providing a services provisioning and configuration system (SPS), according to some embodiments.

FIG. 3 is a flowchart 300 illustrating example operations for providing a services provisioning and configuration system (SPS) 102, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1.

In 310, a request for a provisioning and configuration of a service is received. For example, SPS 102 may receive request 136 from a user 130 via UI 132. The request 136 may include a selection of a service type 118 and may include an indication of a role 134 of the user as well as selections such as intended use of the compute services (development, QA, or production), business functions, and project names.

In 320, a template corresponding to setting up the computing service is identified, the template comprising a first plurality of rules for provisioning the computing service and a second plurality of rules for configuring the computing service. For example, translation layer (TL) 128 may receive the request 136, retrieve a corresponding template 104 for the service type 118 and role 134. The template may include different outlines of rules 116 that may be used for guiding the provisioning and configuration of the service. TL 128 may generate detailed technical inputs to the template based on the pre-configured data mappings.

In 330, a first portion of a template file is instantiated based on the template, the first portion including values for the first plurality of rules for provisioning the computing service in accordance with the request. For example, TL 128 may generate a first portion of template file 126 for PE 106. The first portion may include a first file for PE 106, or identified lines or sections of the template file 126 that is to be applied to PE 106. In some embodiments, TL 128 may receive user values 122, retrieve default values 120 and generate the first portion of template file 126 corresponding to the rules 116 of the identified template 104 that are applicable to PE 106. The template file 126 may include user values 122 and default values 120 arranged in a syntax or computing language readable by PE 106. In some embodiments, the syntax of rules 116 of template 104 applicable to PE 106 may be based on the computing language or syntax of PE 106. In some embodiments, TL 128 may generate or retrieve one or more default values 120 for the requested service type 118. In some embodiments, the default values 120 can vary based on service type 118, role 134, user 130, and which template 104 or pattern 142 was selected.

In 340, the first portion of the template file is applied as input to a provisioning engine to generate one or more provisioned values as a result of the provisioning engine provisioning the computing service, the one or more provisioned values corresponding to at least a subset of the second plurality of rules of the template, the subset of the second plurality of rules being associated with configuring the computing service. For example, after generating a first portion of template file 126 related to PE 106, assigning user values 122 and default values 122 to the various rules 116 for PE 106, the first portion of template file 126 is applied or provided as input to configure PE 106 to generate a set of provisioned values 124. During this process, template files may be validated by policy engine 144, and policy engine 144 may reject or fail the provisioning requests based on the pre-configured policies (e.g., permissions 146).

In some embodiments, the first portion of template file 126 may provide instructions on what computing service to provision and under what constraints the computing service is to be provisioned. The result of PE 106 performing the provisioning in accordance with the first portion of the template file 126, may be that PE generates a provisioned output 112. From the provisioned output 112, TL 128 may identify, select, or extract a set of provisioned values 124 which may be used to generate a second portion of the template file 126 for configuring the provisioned computing service.

For simplicity, template 104 and template file 126 are illustrated as a single boxes in FIG. 1, however it is understood that the portion of template 104 related to provisioning and the first portion of template file 126 may be a first file (or set of files), and the portion of template 104 related to configuring the second portion of template file 126 may be a second file (or set of files). In some embodiments, TL 128 may generate the first portion of the template file 126 in a computing language compatible with PE 106, and TL 128 may generate the second portion of the template file 126 in a computing language compatible with CE 108.

At 350, a second portion of the template file is generated based on the template, the second portion including the provisioned values corresponding to at least a subset of the second plurality of rules for configuring the computing service. For example, TL 128 may generate a second portion of template file 126 for CE 108. The second portion may include a second file for CE 108, or identified lines or sections of the template file 126 that is to be applied to CE 108. In some embodiments, TL 128 may receive user values 122, retrieve default values 120, and use the provisioned values 124 and generate the second portion of template file 126 corresponding to the rules 116 of the identified template 104 that are applicable to CE 108. The template file 126 may include user values 122, default values 120, and provisioned values 124 arranged in a syntax or computing language readable by CE 108. In some embodiments, the syntax of rules 116 of template 104 applicable to CE 108 may be based on the computing language or syntax of CE 108.

At 360, the second portion of the template file is applied as input to a configuring engine, wherein the configuring engine is configured to use the second portion of the template file, applied as input, to configure the computing service. For example, TL 128 may provide the second portion of template file 126 including the provisioned values 124 and default values 120 (and any relevant user values 122) to CE 108 to configure the provisioned computing service on computing device 110 (or across multiple computing devices 110). During this process, template files may be validated by policy engine 144, and policy engine 144 may reject or fail the provisioning requests based on the pre-configured policies (e.g., permissions 146).

In 370, it is determined that the service has been configured by the configuration engine. For example, SPS 102 may receive a configured output 114 indicating that the service has been configured by CE 108.

In 380, the service, as provisioned by the provisioning engine and configured by the configuration service, is provided for use by one or more users. For example, SPS 102 may generate an electronic message or notification for user 130 indicating the failure or success of the provisioning and configuration tasks, and if success, any information that may be necessary to access or user the provisioned and configured (or updated) service.

Figure 4:
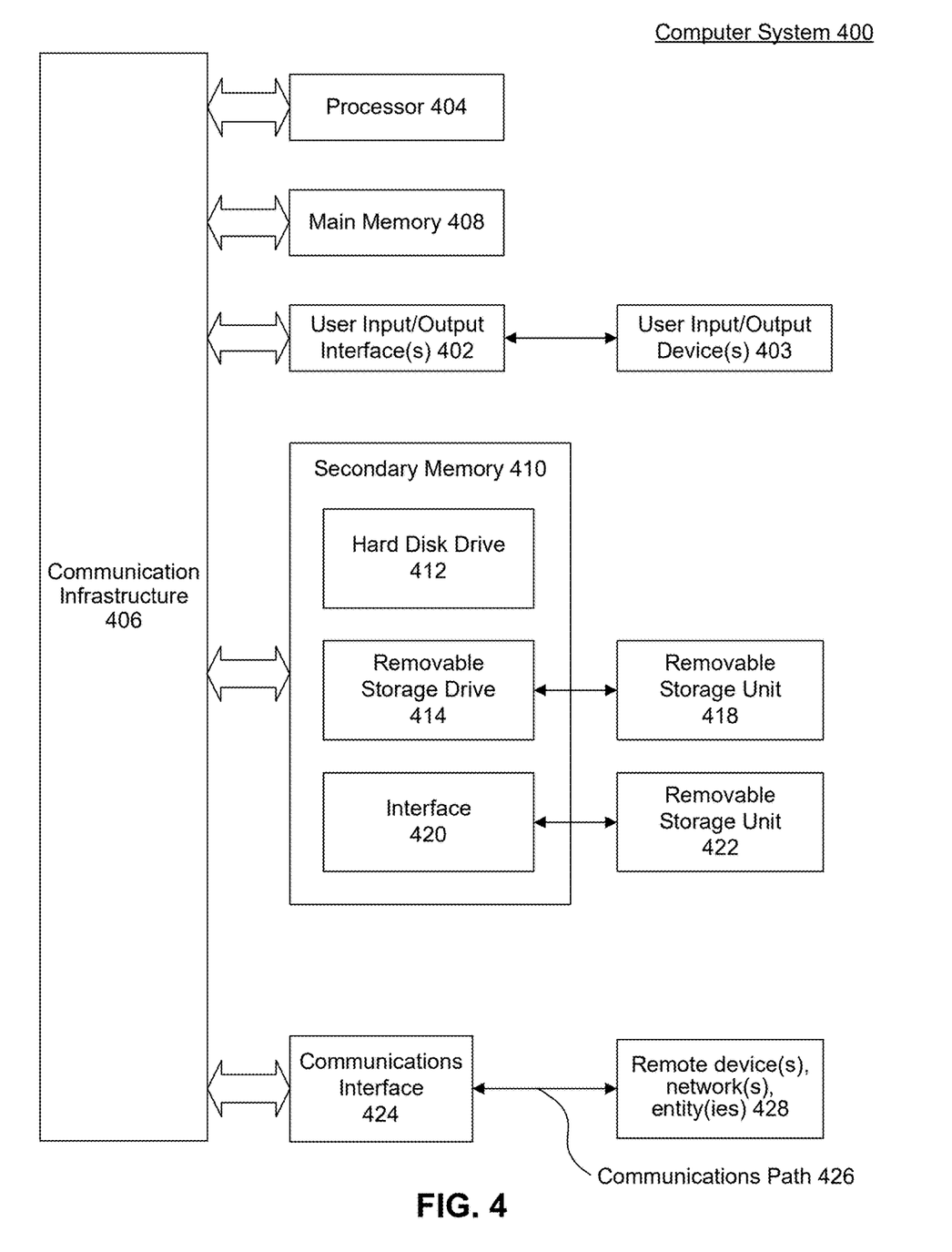
FIG. 4 is example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer-implemented method for provisioning and configuring a computing service comprising:
   receiving a request for the provisioning and configuration of the computing service;
   identifying, by at least one computer processor, a template corresponding to setting up the computing service, the template comprising a first plurality of rules for provisioning the computing service and a second plurality of rules for configuring the computing service;
   generating a first portion of a template file based on the template, the first portion including values for the first plurality of rules for provisioning the computing service in accordance with the request;
   applying the first portion of the template file as a first input to a provisioning engine to generate one or more provisioned values as a result of the provisioning engine provisioning the computing service, the one or more provisioned values corresponding to at least a subset of the second plurality of rules of the template, the subset of the second plurality of rules being associated with configuring the computing service;
   generating a second portion of the template file based on the template, the second portion including the one or more provisioned values corresponding to at least a subset of the second plurality of rules for configuring the computing service;
   applying the second portion of the template file as a second input to a configuring engine, wherein the configuring engine is configured to use the second portion of the template file, applied as the second input, to configure the computing service;
   determining that the computing service has been configured by the configuring engine; and
   providing the computing service, as provisioned by the provisioning engine and configured by the configuring engine, for use by one or more users.

2. The computer-implemented method of claim 1, further comprising:
   receiving one or more user values from the one or more users, wherein the one more user values correspond to a subset of the second plurality of rules of the template for configuring the computing service; and
   wherein the providing the one or more provisioned values comprises providing the one or more user values to the configuring engine, wherein the computing service is configured in accordance with the one or more user values.

3. The computer-implemented method of claim 2, further comprising:
   determining a default value for a first rule of the second plurality of rules for configuring the computing service, wherein the default value was generated prior to receiving the one or more user values;
   determining that a first user value of the one or more user values corresponds to the first rule; and
   providing the first user value, in lieu of the first default value, to the configuring engine for the first rule.

4. The computer-implemented method of claim 2, further comprising:
   determining one or more permissions associated with the one or more users;
   determining that the request or the one or more user values are not in accordance with the one or more permissions associated with the one or more users; and
   providing a rejection notification to the one or more users, the rejection prompts the one or more users for a new user value in accordance with the one or more permissions.

5. The computer-implemented method of claim 2, comprising:
   determining a role of a first user of the one or more users;
   identifying a set of role rules comprising one or more of the plurality of the second plurality of rules; and
   prompting the first user for the one or more user values corresponding to the identified set of role rules.

6. The computer-implemented method of claim 1, wherein the template comprises a first template in a grouping of a plurality of templates, wherein each template of the plurality of templates of the grouping is associated with provisioning and configuring a different computing service or device for a particular use case, and wherein the request corresponds to a first use case for a first grouping including the first template.

7. The computer-implemented method of claim 6, wherein the grouping comprises a first grouping in a library comprising a plurality of groupings.

8. The computer-implemented method of claim 1, wherein the first portion of the template file is generated in a first computing language corresponding to the provisioning engine, and wherein the second portion of the template is generated in a second computing language corresponding to the configuring engine.

9. The computer-implemented method of claim 1, wherein the request comprises a single request for a plurality of interconnected computing services, and wherein the first portion of the template file includes values for provisioning the plurality of interconnected computing services corresponding to the single request.

10. A system for provisioning and configuring a computing service, comprising:
    one or more memories;
    at least one processor each coupled to at least one of the memories and configured to perform operations comprising:
      receiving a request for the provisioning and configuration of the computing service;
      identifying a template corresponding to setting up the computing service, the template comprising a first plurality of rules for provisioning the computing service and a second plurality of rules for configuring the computing service;
      generating a first portion of a template file based on the template, the first portion including values for the first plurality of rules for provisioning the computing service in accordance with the request;
      applying the first portion of the template file as a first input to a provisioning engine to generate one or more provisioned values as a result of the provisioning engine provisioning the computing service, the one or more provisioned values corresponding to at least a subset of the second plurality of rules of the template, the subset of the second plurality of rules being associated with configuring the computing service;
      generating a second portion of the template file based on the template, the second portion including the one or more provisioned values corresponding to at least a subset of the second plurality of rules for configuring the computing service;
      applying the second portion of the template file as a second input to a configuring engine, wherein the configuring engine is configured to use the second portion of the template file, applied as the second input, to configure the computing service;

determining that the computing service has been configured by the configuring engine; and providing the computing service, as provisioned by the provisioning engine and configured by the configuring engine, for use by one or more users.

11. The system of claim 10, the operations further comprising:

receiving one or more user values from the one or more users, wherein the one more user values correspond to a subset of the second plurality of rules of the template for configuring the computing service; and wherein the providing the one or more provisioned values comprises providing the one or more user values to the configuring engine, wherein the computing service is configured in accordance with the one or more user values.

12. The system of claim 11, the operations further comprising:

determining a default value for a first rule of the second plurality of rules for configuring the computing service, wherein the default value was generated prior to receiving the one or more user values;

determining that a first user value of the one or more user values corresponds to the first rule; and providing the first user value, in lieu of the first default value, to the configuring engine for the first rule.

13. The system of claim 11, the operations further comprising:

determining one or more permissions associated with the one or more users;

determining that the request or the one or more user values are not in accordance with the one or more permissions associated with the one or more users; and providing a rejection notification to the one or more users, the rejection prompts the one or more users for a new user value in accordance with the one or more permissions.

14. The system of claim 11, the operations further comprising:

determining a role of a first user of the one or more users;

identifying a set of role rules comprising one or more of the plurality of the second plurality of rules; and prompting the first user for the one or more user values corresponding to the identified set of role rules.

15. The system of claim 10, wherein the template comprises a first template in a grouping of a plurality of templates, wherein each template of the plurality of templates of the grouping is associated with provisioning and configuring a different computing service or device for a particular use case, and wherein the request corresponds to a first use case for a first grouping including the first template.

16. The system of claim 15, wherein the grouping comprises a first grouping in a library comprising a plurality of groupings.

17. The system of claim 10, wherein the first portion of the template file is generated in a first computing language corresponding to the provisioning engine, and wherein the second portion of the template is generated in a second computing language corresponding to the configuring engine.

18. A non-transitory computer-readable medium having instructions stored thereon that, when executed by at least one computing device, cause the at least one computing device to perform operations comprising:

receiving a request for provisioning and configuration of a computing service;

identifying a template corresponding to setting up the computing service, the template comprising a first plurality of rules for provisioning the computing service and a second plurality of rules for configuring the computing service;

generating a first portion of a template file based on the template, the first portion including values for the first plurality of rules for provisioning the computing service in accordance with the request;

applying the first portion of the template file as a first input to a provisioning engine to generate one or more provisioned values as a result of the provisioning engine provisioning the computing service, the one or more provisioned values corresponding to at least a subset of the second plurality of rules of the template, the subset of the second plurality of rules being associated with configuring the computing service;

generating a second portion of the template file based on the template, the second portion including the one or more provisioned values corresponding to at least a subset of the second plurality of rules for configuring the computing service;

applying the second portion of the template file as a second input to a configuring engine, wherein the configuring engine is configured to use the second portion of the template file, applied as the second input, to configure the computing service;

determining that the computing service has been configured by the configuring engine; and providing the computing service, as provisioned by the provisioning engine and configured by the configuring engine, for use by one or more users.

19. The non-transitory computer-readable medium of claim 18, the operations further comprising:

receiving one or more user values from the one or more users, wherein the one more user values correspond to a subset of the second plurality of rules of the template for configuring the computing service; and wherein the providing the one or more provisioned values comprises providing the one or more user values to the configuring engine, wherein the computing service is configured in accordance with the one or more user values.

20. The non-transitory computer-readable medium of claim 19, the operations further comprising:

determining a default value for a first rule of the second plurality of rules for configuring the computing service, wherein the default value was generated prior to receiving the one or more user values;

determining that a first user value of the one or more user values corresponds to the first rule; and providing the first user value, in lieu of the first default value, to the configuring engine for the first rule.

* * * * *